Patented Oct. 21, 1941

2,259,470

UNITED STATES PATENT OFFICE 2,259,470

RUBBERLIKE CONDENSATION PRODUCTS

Helmut Jacobi and Walter Flemming, Ludwigshafen-on-the-Rhine, Germany

No Drawing. Application February 8, 1939, Serial No. 255,256. In Germany February 18, 1938

3 Claims. (Cl. 260—79)

The present invention relates to rubber-like condensation products.

It is already known that high molecular weight condensation products are formed by the reaction of alkali, ammonium or alkaline earth polysulphides with polyhalogen derivatives of aliphatic hydrocarbons.

We have now found that valuable rubber-like condensation products are obtained by reacting a water-soluble polysulphide, i. e. an alkali, ammonium or alkaline earth polysulphide, with allyl chloride. The reaction is carried out by heating the reaction mixture at between 50 and 150° C., preferably by boiling under reflux cooling. It may, however, also be carried out in a closed vessel under increased pressure. In the reaction there are formed at first viscous products. These, when they still contain unsaturated linkages, may be further polymerized by further heating at the reaction temperature for some hours, whereby rubber-like products are formed. The rubber-like condensation products may also be provided with fillers and vulcanized after the addition of sulphur. The resulting masses are distinguished by good stability to solvents and oils.

The following example will further illustrate how this invention may be carried out in practice, but the invention is not restricted to this example. The parts are by weight.

Example 720 parts of sodium sulphide ($Na_2S.9H_2O$) are fused with 360 parts of sulphur. When the sulphur has dissolved, 180 parts of water and 180 parts of methanol are added. While stirring continuously and with good reflux cooling, 235 parts of allyl chloride are slowly added and the whole stirred for an hour at about 70° C. 250 parts of a mixture of methanol and water are then distilled off. The distillate has common salt added to it and the oil thus separated is returned to the reaction vessel. After adding 250 parts of water, the reaction mixture is kept for 5 hours at 95° C. while stirring continuously. There is thus formed a viscous brown mass which is stable to organic solvents and oils and is suitable for the preparation of shaped articles.

What we claim is:

1. A process of producing rubber-like, condensation products which comprises heating a mixture of allyl chloride and a water-soluble polysulfide until elastic condensation products of rubber-like character are formed.

2. Rubber-like, condensation products of allyl chloride and a watersoluble polysulphide, said products being obtained by the method of claim 1.

3. A composition of matter comprising a rubber-like, condensation product of allyl chloride and a watersoluble polysulphide vulcanized in the presence of sulphur, said condensation products being obtained by the method of claim 1.

HELMUT JACOBI.
WALTER FLEMMING.